US012780304B2

(12) United States Patent
Nahidi et al.

(10) Patent No.: US 12,780,304 B2
(45) Date of Patent: Nov. 3, 2026

(54) VEHICLE STEERING SYSTEM WITH ANGLED ROAD SURFACE COMPENSATION

(71) Applicant: GM GLOBAL TECHNOLOGY OPERATIONS LLC, Detroit, MI (US)

(72) Inventors: Seyedeh Asal Nahidi, North York (CA); Raed N. Abuaita, Fenton, MI (US); Amin Habibnejad Korayem, Markham (CA); Jason W. Gaydos, Waterford, MI (US); Mohammadali Shahriari, Markham (CA); Matthew Bruce, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 19/036,427

(22) Filed: Jan. 24, 2025

(65) Prior Publication Data

US 2026/0217311 A1 Jul. 30, 2026

(51) Int. Cl.
*B62D 6/04* (2006.01)
*B62D 5/00* (2006.01)
*G06V 20/56* (2022.01)

(52) U.S. Cl.
CPC ................ *B62D 6/04* (2013.01); *B62D 5/001* (2013.01); *G06V 20/588* (2022.01)

(58) Field of Classification Search
CPC .... B62D 5/0463; B62D 5/0472; B62D 6/007; B62D 6/04
USPC ...................................................... 701/41–44
See application file for complete search history.

(56) References Cited

U.S. PATENT DOCUMENTS

| | | | | |
|---|---|---|---|---|
| 7,364,006 B2 * | 4/2008 | Birsching | B62D 5/0835 | 91/375 A |
| 2010/0125391 A1 * | 5/2010 | Yang | B60T 8/1755 | 701/41 |
| 2011/0022270 A1 * | 1/2011 | Tamaizumi | B62D 6/04 | 701/41 |
| 2012/0296525 A1 * | 11/2012 | Endo | B62D 5/0466 | 701/42 |
| 2014/0297123 A1 * | 10/2014 | Nozawa | B62D 5/0463 | 701/41 |
| 2016/0107681 A1 * | 4/2016 | Dutsky | B62D 5/0835 | 180/422 |

(Continued)

FOREIGN PATENT DOCUMENTS

| | | |
|---|---|---|
| DE | 69930594 T2 | 5/2006 |
| DE | 102018105804 A1 | 9/2018 |
| DE | 102017210410 A1 | 12/2018 |

*Primary Examiner* — Hai H Huynh
*Assistant Examiner* — Johnny H Hoang
(74) *Attorney, Agent, or Firm* — Quinn IP Law

(57) ABSTRACT

A steering system includes a controller in communication with sensors. The controller is configured to determine a counter-torque to apply to the steering system with a leads and pulls compensation system based on an input to a steering wheel, apply the counter-torque to the steering system and determine an operating status of an advanced driver-assistance system. The controller is also configured to determine an angle of a road surface based on a plurality of sensors when the advanced driver-assistance system is activated and apply an updated counter-torque to the steering system when the advanced driver-assistance system is activated and at least one of a magnitude or a direction of the angle of the road surface changes.

20 Claims, 6 Drawing Sheets

(56) References Cited

U.S. PATENT DOCUMENTS

| | | | | |
|---|---|---|---|---|
| 2018/0162445 | A1* | 6/2018 | Namikawa | G08G 1/161 |
| 2020/0114963 | A1* | 4/2020 | Kim | B62D 6/003 |
| 2022/0081030 | A1* | 3/2022 | Miyake | B62D 6/008 |
| 2022/0266901 | A1* | 8/2022 | Kim | B62D 6/008 |
| 2022/0306119 | A1* | 9/2022 | Weston | B60Q 1/20 |
| 2023/0264692 | A1* | 8/2023 | Tagesson | B60W 30/10 701/23 |
| 2025/0065828 | A1* | 2/2025 | Armiyoon | B60R 16/0231 |

* cited by examiner

VEHICLE STEERING SYSTEM WITH ANGLED ROAD SURFACE COMPENSATION

BACKGROUND

The present disclosure relates to steering systems for vehicles, and more particularly to a steering system compensating for road crown.

When operating a vehicle, the driver may need to compensate for external forces, such as a road crown or wind, that will move the vehicle off course. To aid the driver, a Leads and Pulls Compensation (LPC) system can apply a corrective torque to the steering system such that the driver no long needs to apply force to the steering wheel to maintain the vehicle traveling in a straight direction.

SUMMARY

Disclosed herein is a steering system. The system includes a controller in communication with sensors. The controller is configured to determine a counter-torque to apply to the steering system with a leads and pulls compensation system based on an input to a steering wheel, apply the counter-torque to the steering system and determine an operating status of an advanced driver-assistance system. The controller is also configured to determine an angle of a road surface based on a plurality of sensors when the advanced driver-assistance system is activated and apply an updated counter-torque to the steering system when the advanced driver-assistance system is activated and at least one of a magnitude or a direction of the angle of the road surface changes.

In one aspect of the disclosure the angle of a road surface is determined based on individual estimates of the angle of the road surface from the plurality of sensors.

In one aspect of the disclosure the individual estimates of the angle of the road are each weighted to generate a fused angle of the road surface.

In one aspect of the disclosure the individual estimates of the angle of the road surface include an inertial measurement unit based angle estimation, a map based angle estimation, a camera based angle estimation, and a steering rack force angle estimation.

In one aspect of the disclosure the controller is configured to determine the angle of the road surface based on performing a cross error calculation on each of the individual estimates of the angle of the road surface.

In one aspect of the disclosure the updated counter-torque includes applying zero torque when the advanced driver-assistance system is activated and at least one of the magnitude or the direction of the angle of the road surface changes.

In one aspect of the disclosure the plurality of sensors include a front camera module and an inertial measurement unit.

In one aspect of the disclosure the controller is configured to determine the angle of the road surface based on high definition map images.

In one aspect of the disclosure the sensors include at least one wheel speed sensor.

In one aspect of the disclosure the steering system is a steer-by-wire system.

In one aspect of the disclosure the controller is configured to determine the angle of the road surface based on determining a steering rack force.

Disclosed herein is a method of operating a steering system on a vehicle. The method includes determining a counter-torque to apply to a steering system with a leads and pulls compensation system based on an input to a steering wheel on the vehicle, applying the counter-torque to the steering system on the vehicle, and determining an operating status of an advanced driver-assistance system on the vehicle. The method also includes determining an angle of a road surface supporting the vehicle with a plurality of sensors on the vehicle when the advanced driver-assistance system is activated and applying an updated counter-torque to the steering system when the advanced driver-assistance system is activated at least one of a magnitude or direction of the angle of the road surface.

In one aspect of the disclosure the angle of a road surface is determined based on individual estimates of the angle of the road from the plurality of sensors.

In one aspect of the disclosure the individual estimates of the angle of the road surface are each weighted to generate a fused angle of the road surface.

In one aspect of the disclosure the individual estimates of the angle of the road surface include an inertial measurement unit based angle estimation, a map based angle estimation, a camera based angle estimation, and a steering rack force angle estimation.

In one aspect of the disclosure determining the angle of the road surface supporting the vehicle includes performing a cross error calculation on each of the individual estimates of the angle of the road surface.

In one aspect of the disclosure the updated counter-torque includes applying zero torque when the advanced driver-assistance system is activated and at least one of the magnitude or the direction of the angle of the road surface changes.

In one aspect of the disclosure the sensors include a front camera module and an inertial measurement unit.

Disclosed herein is a vehicle. The vehicle includes a steering system configured to change a road angle with respect to at least one of a plurality of wheels and a controller in communication with sensors and the steering system. The controller is configured to determine a counter-torque to apply to the steering system with a leads and pulls compensation system based on an input to a steering wheel, apply the counter-torque to the steering system and determine an operating status of an advanced driver-assistance system. The controller is also configured to determine an angle of a road surface based on a plurality of sensors when the advanced driver-assistance system is activated and apply an updated counter-torque to the steering system when the advanced driver-assistance system is activated and at least one of a magnitude or a direction of the angle of the road surface changes.

In one aspect of the disclosure the controller is configured to determine the angle of the road surface based on determining a steering rack force.

BRIEF DESCRIPTION OF THE DRAWINGS

The accompanying drawings, which are incorporated into and constitute a part of this specification, illustrate implementations of the disclosure and together with the description, explain the principles of the disclosure.

In the drawings, reference numbers may be reused to identify similar and/or identical elements.

DETAILED DESCRIPTION

A vehicle may operate on roads with a road angle (a convex, angled, banked, or crown surface) to improve water drainage and prevent the accumulation of water on the road surface. When roads are flat or concave, water accumulates on the road surface and may cause the vehicle to hydroplane and/or road damage to occur. While angled roads reduce problems associated with water drainage, they introduce additional lateral forces on the vehicle due to a tilted mass of the vehicle.

During operation of the vehicle on roads, the driver may need to apply a constant force to the steering wheel to maintain the vehicle traveling in a straight line. To aid the driver, the vehicle can utilize a leads and pulls compensation (LPC) system to relieve the driver from needing to apply a constant force to the steering wheel. For example, the LPC system utilizes information from sensors throughout the vehicle to detect when the vehicle is constantly pulling to one side or requires a constant steering input to maintain a straight path. The LPC system utilizes a learning function to determine a counter-torque to apply through the steering system to aid in maintaining the vehicle along a straight path. However, when the vehicle activates features from an advanced driver-assistance system (ADAS), such as Hands-on Lane Centering Assist (HoLCA) or Lane Keep Assist (LKA), that are separate from the LPC system, the LPC system no longer performs active learning as the LPC system does not integrate ADAS overlap data.

The suspension of active learning for the LPC system when the ADAS is activated presents challenges when a direction, such as left or right, or magnitude of a crowned road changes. In particular, this change can occur when the vehicle transitions from operating on a right side of a crowned road to a left side of the crowned road or vice versa. The active ADAS can prevent the LPC system from learning a new counter-torque to apply due to a suspension of the learning function when the ADAS is activated. Therefore, the previously determined counter-torque may be ineffective at eliminating the need to apply a constant steering input. One feature of this disclosure is to allow the LPC system to apply an updated counter-torque when the ADAS is activated. In one example, the vehicle utilizes one or more sensors, high definition (HD) maps, and/or a rack force estimation to assess lateral road forces arising from varying road angles.

Figure 1A:
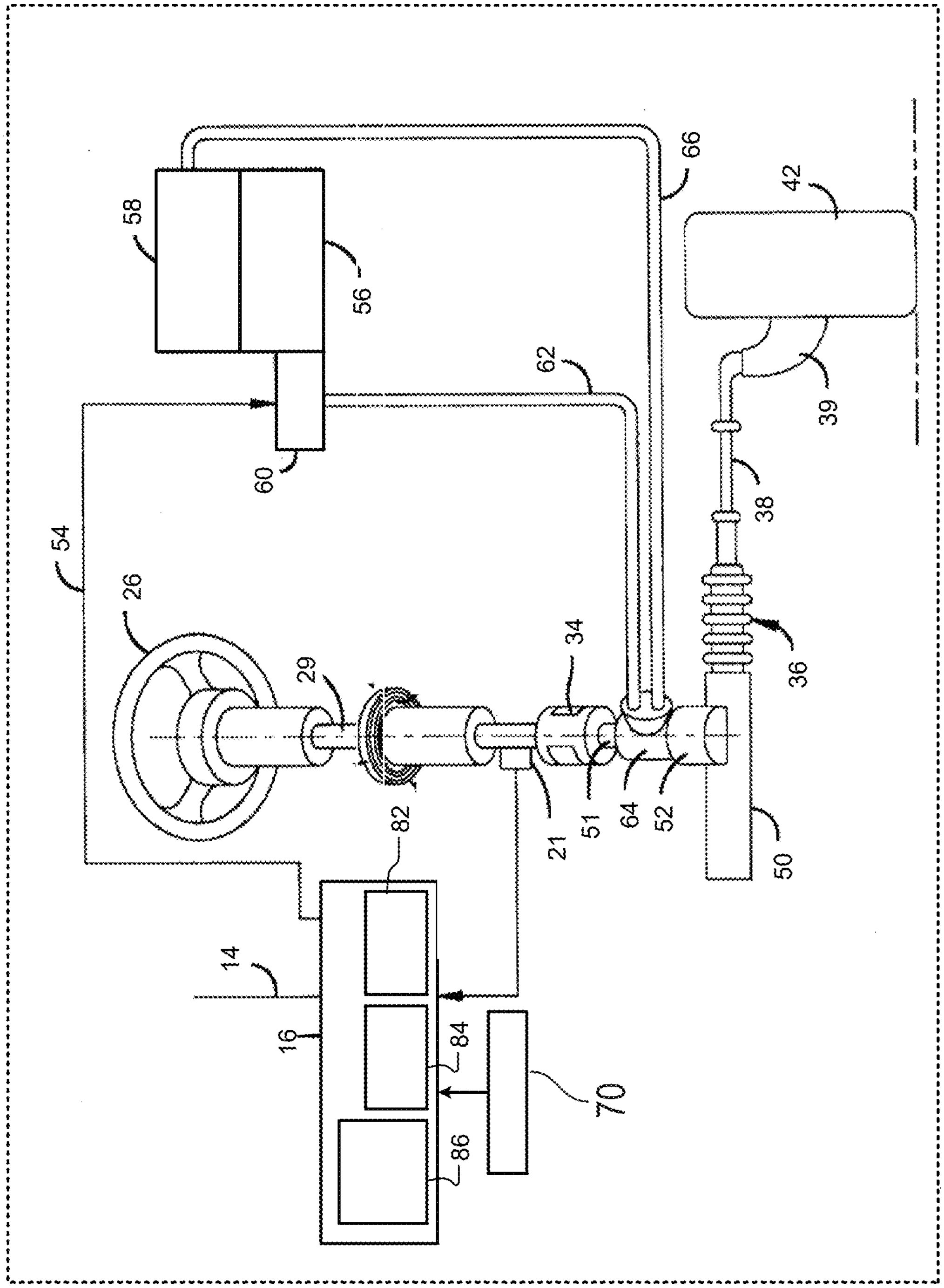
FIG. 1A is a functional block diagram of an example of a hydraulic power steering (HPS) system including a controller with a torque steer mitigation module and a road angle detection module according to the present disclosure.
Figure 1B:
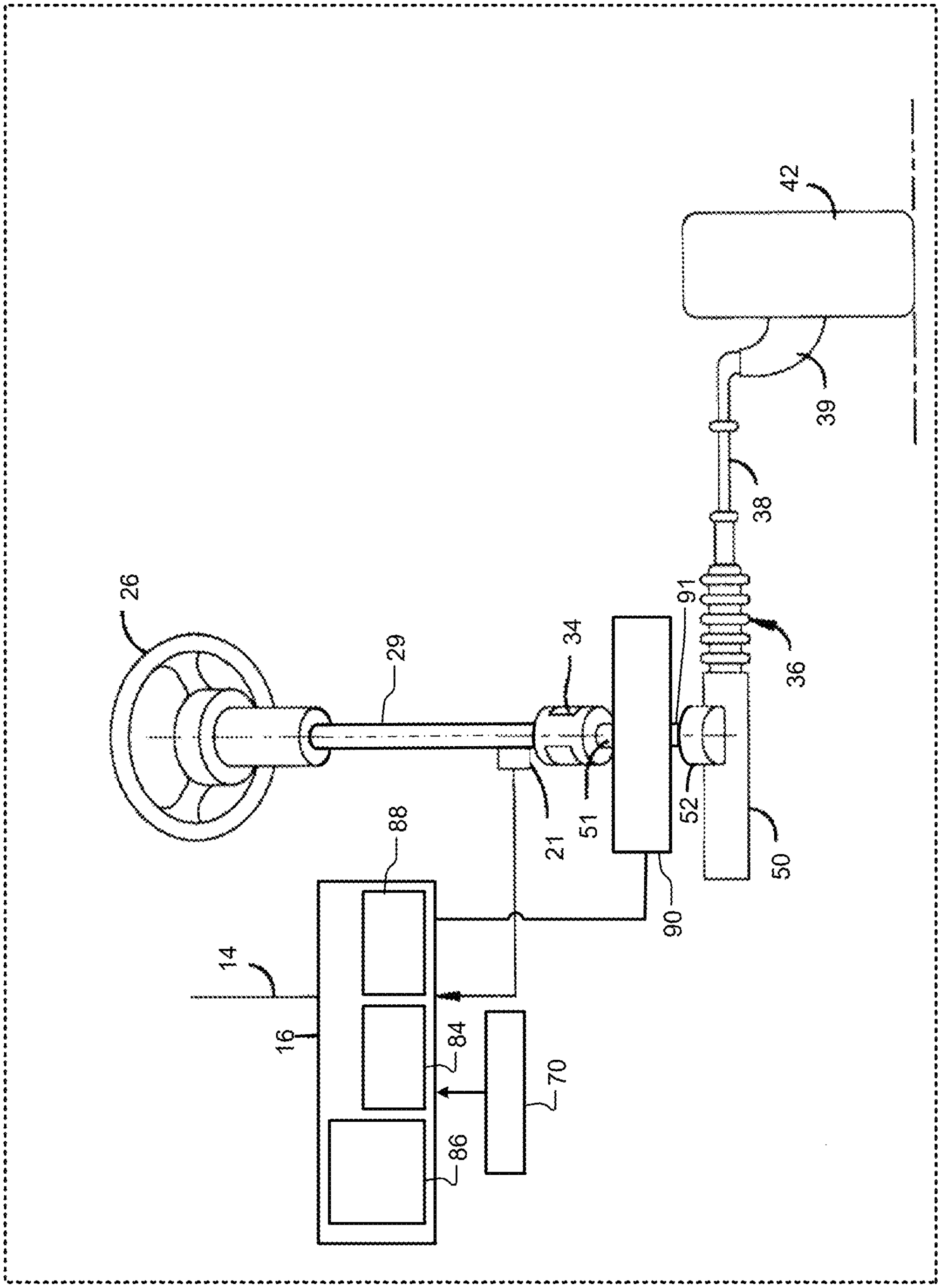
FIG. 1B is a functional block diagram of an example of an electronic power steering (EPS) system including a controller with a torque steer mitigation module and a road angle detection module according to the present disclosure.
Figure 1C:
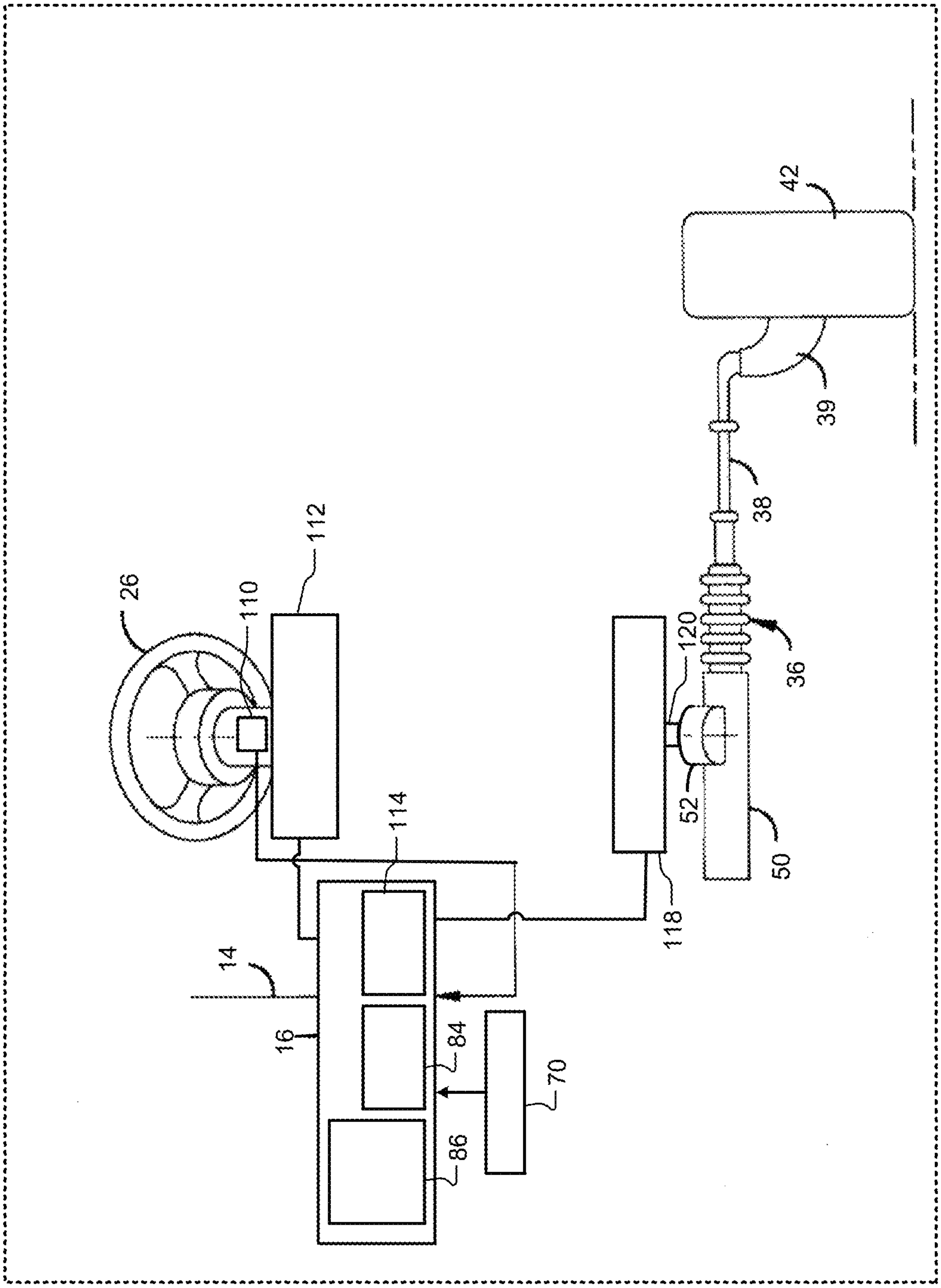
FIG. 1C is a functional block diagram of an example of a steer-by-wire (SBW) system including a controller with a torque steer mitigation module and a road angle detection module according to the present disclosure.

Referring now to FIGS. 1A to 1C, examples of hydraulic, electronic, and steer-by-wire power steering systems are shown, respectively, that can be incorporated into a vehicle 10. While examples of these power steering systems are shown, this disclosure applies to other power steering system. In FIG. 1A, a steering mechanism 36 is a rack-and-pinion type system that includes a toothed rack (not shown) and a pinion gear (also not shown) located inside rack and gear housings 50 and 52. As a driver turns a steering wheel 26, the steering shaft 29 rotates a lower steering shaft 51, which is connected to the steering shaft 29 through a universal joint 34. The lower steering shaft 51 turns the pinion gear. Rotation of the pinion gear moves the rack which moves tie rods 38 connected to steering knuckles 39 and wheels 42 (one side shown).

The hydraulic power steering system includes an actuator 60 that controls a pump 56 that pumps hydraulic fluid from a reservoir 58. The actuator 60 is connected by a hydraulic line 62 to a variable assist actuator 64. A hydraulic line 66 connects the variable assist actuator 64 back to a reservoir 58. The variable assist actuator 64 provides variable hydraulic assist torque. In general, the vehicle engine (not shown) rotates the pump 56. In response to control signals on line 54, actuator 60 selectively valves the pressurized fluid from the pump 56 to hydraulic line 62, selectively controlling the hydraulic assist torque provided by the system. Hydraulic line 62 is input to the hydraulic assist actuator 64, which provides hydraulic power assist to the steering system through the lower steering shaft 51. Hydraulic fluid output from the hydraulic assist actuator 64 returns to the reservoir 58 through hydraulic line 66.

In some examples, a vehicle speed signal 14 is input to the controller 16 and sensors 21 provide a steering wheel position signal and/or a steering wheel torque signal to controller 16. The controller 16 also uses steering wheel speed information, which the controller 16 may determine by integrating the steering wheel position signal. In some examples, the sensor 21 may include an optical encoding type sensor, variable resistance type sensor or another suitable type of position sensor in addition to the torque sensor.

In operation, as the driver drives the vehicle and turns the steering wheel, the controller 16 senses the vehicle speed, steering wheel position, steering wheel torque, and/or steering wheel velocity. The controller 16 generates a command for the actuator 60. By controlling the flow of hydraulic fluid through actuator 60 to hydraulic line 62, the controller 16 indirectly controls the pump 56, which automatically turns on and off in response to fluid pressure in the reservoir 58. Controller 16 controls the actuator 60 so that, during normal driving conditions, a relatively constant low flow of hydraulic fluid is provided to the hydraulic assist actuator 64 through hydraulic line 62. The flow of hydraulic fluid to the actuator 64 is increased in response to high steering wheel velocity or lateral acceleration maneuvers.

In one example, the controller 16 includes a leads and pulls compensation module 84 that estimates a compensating steering wheel feedback torque. The compensating steering wheel feedback torque is output to a hydraulic power steering module 82 that adjusts operation of the steering system. A road angle detection module 86 described further below detects when the vehicle is driving at a road angle and/or provides a road angle torque feedback to the hydraulic power steering module 82.

In FIG. 1B, an input of an electronic power steering (EPS) motor 90 is connected to the steering shaft 29. An output of the EPS motor 90 is connected to a steering shaft 91 driving the pinion. The EPS motor 90 varies torque assist in response to an EPS module 88, the leads and pulls compensation module 84, and the road angle detection module 86 as will be described further below.

In FIG. 1C, an angular position and torque of the steering wheel 26 are sensed by sensors 110. A steering wheel motor 112 is configured to provide steering wheel feedback to the steering wheel 26 to provide road feel. The controller 16 is configured to control a road wheel angle (RWA) motor 118 configured to adjust an angle of the wheels. The steering wheel motor 112 varies torque assist in response to a steer-by-wire (SBW) module 114, the leads and pulls compensation module 84, and the road angle detection module 86 as will be described further below. An output of the RWA motor 118 is connected by a steering shaft 120 driving the pinion.

Figure 2:
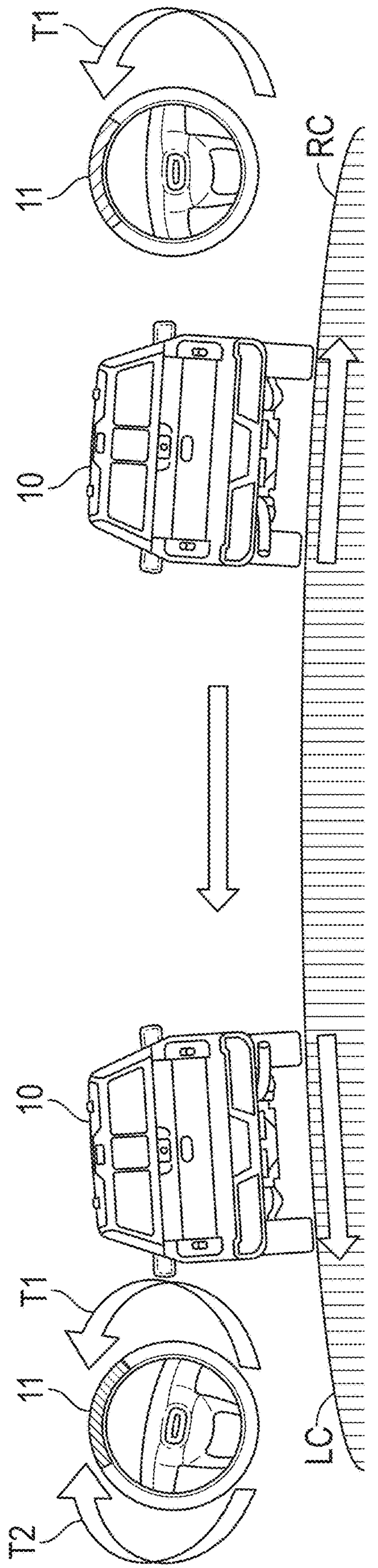
FIG. 2 illustrates an example of a vehicle travelling on flat or angled roads having a non-zero road angle.

As shown in FIG. 2, when the vehicle 10 is on a right crown RC of the road, the LPC system learns a first torque T1 that is applied to the steering wheel 11 to maintain the vehicle 10 in a straight line. When the vehicle 10 transitions to a left crown LC of the road with the ADAS system activated, the learning of the LPC system is disabled. Therefore, if the vehicle 10 continued to maintain the first torque T1 that was utilized to maintain the vehicle 10 in a straight direction when traveling on the right crown RC, the vehicle 10 would move closer to a left edge of the road surface. The ADAS system then applies a second torque T2 to keep or assist the vehicle 10 to remain on the road surface. One feature of this disclosure is directed to updating torque applied by the LPC system when the ADAS is activated by the road surface of the vehicle includes a change in magnitude or direction (e.g., left to right crown).

Figure 3:
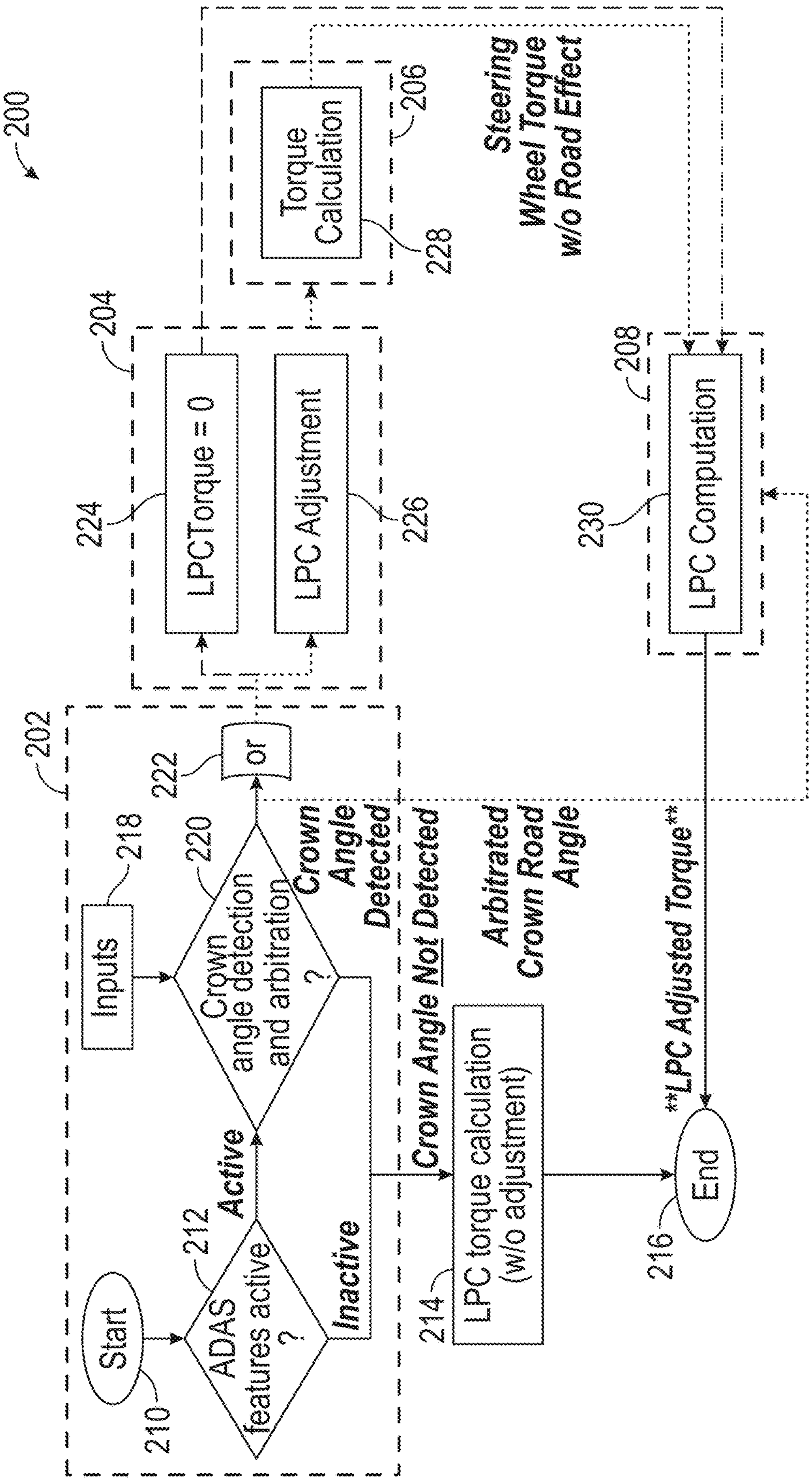
FIG. 3 is a flowchart of an example of a method for performing leads and pulls compensation on a crowned road surface.

FIG. 3 illustrates a flow chart of an example method 200 of performing a leads and pulls compensation when changing lanes along a road surface, such as a crowned road surface. The method 200 includes a first portion 202 that performs a road angle detection, a second portion 204 that selects a leads and pulls compensation strategy, a third portion 206 that performs a steering wheel torque calculation, and a fourth portion 208 that performs leads and pulls compensation computations.

In the first portion 202 of the method 200, the method 200 begins at block 210 ("Start"). The method 200 then proceeds to block 212. At block 212 ("ADAS Features Active?"), the method 200 determines if advanced driver-assistance system (ADAS) features on the vehicle are active, such as Hands-on Lane Centering Assist (HoLCA) and Lane Keep Assist (LKA). If the ADAS features are inactive, the method proceeds to block 214.

At block 214 ("LPC Torque Calculations (w/o Adjustment)"), the method 200 performs the LPC torque calculations without adjusting for crown angle and then proceeds to block 216 ("End") and the method 200 ends.

If the ADAS features at block 212 are determined to be active, the method 200 proceeds to block 220. At block 220 ("Crown Angle Detection and Arbitration"), the method 200 detects the crown angle utilizing multiple inputs from block 218 ("Inputs"). The crown angle detection and arbitration performed at block 220 is shown in greater detail in FIG. 4.

Figure 4:
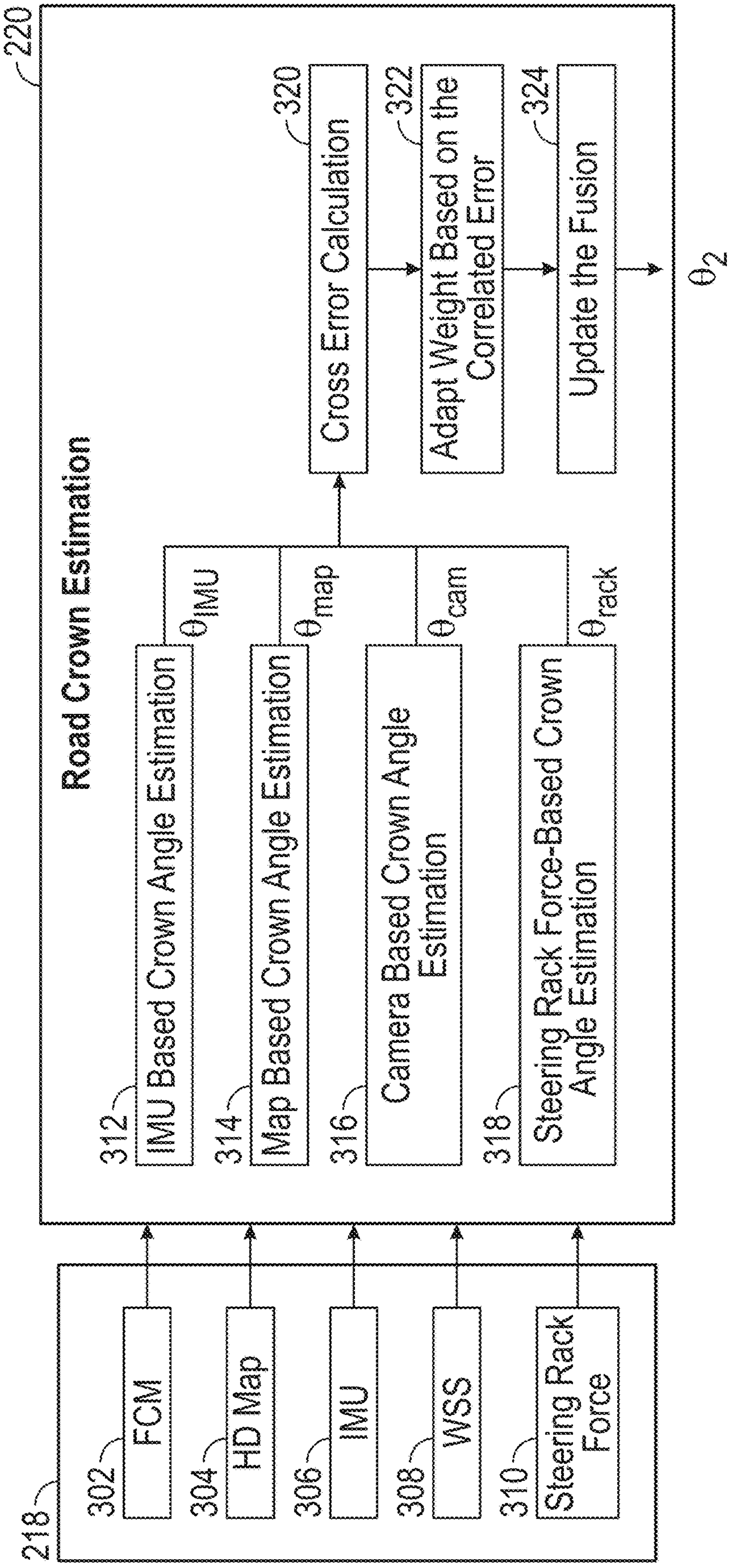
FIG. 4 is a flowchart of a method of performing crown angle detection and arbitration.

As shown in FIG. 4, the inputs from block 218 can include at least one of images from a front camera module (FCM) 302, high-definition (HD) maps 304, inertial measurement unit (IMU) data from an IMU 306, wheel speed sensor (WSS) data from a WSS 308, or steering rack force 310. These input are fed into block 220 to determine individual estimations of the angle of the road surface. With the inputs from Block 218, the method 200 can perform an IMU based crown angle estimation to generate an IMU based crown angle estimation $\theta_{IMU}$ at block 312. With the input from block 218, the method 200 also performs a map based crown angle estimation to generate a map based crown angle estimation $\theta_{Map}$ at block 314. With the input from block 218, the method 200 also performs a camera based crown angle estimation to generate a camera based crown angle estimation $\theta_{Cam}$ at block 316.

The method 200 also performs a steering rack force-based crown angle estimation at block 318 to generate a steering rack force based crown angle estimation $\theta_{Rack}$. In a first step of block 318, the road angle detection module 86 detects a road angle. In some examples, to eliminate or reduce the effect of the road angle on the lateral force estimation, the estimation of lateral force is based on rack force in the front axle $F_{yf}$:

$$F_{yf} = \left(\frac{LF_r - F_{xtotal}\cos(\tau)[r_{kp}\cos(\gamma) + R_{nom}\sin(\gamma)] - T_{z_{total}}}{\cos(\gamma)[t\cos(\tau) + R_{nom}\sin(\tau)}\right)$$

where, $T_{z_{total}}$, $F_{z_{totoal}}$, and $N_{fx}$ can be calcuted as follows:

$$T_{z_{total}} = F_{z_{total}}\sin(\gamma)\cos(\tau)\sin(\delta_f)[\cos(\tau)(r_{kp}\sin(\tau))]$$

$$F_{z_{total}} = \frac{N_{fx}}{2} + \frac{Z_g N_{fx} a_y}{L_f g}$$

$$N_{fx} = \frac{mgX_r}{X_r + X_f} - \frac{ma_x Z_g}{X_r + X_f}$$

In the above equations L is the steering arm lever, Fr is the rack force, $r_{kp}$ is the steering axis offset from the tire in lateral direction, $R_{nom}$ is the nominal tire radius, $\gamma$ is the kingpin angle, and $\tau$ is the camber angle. $X_f$ and $X_r$ are the vehicle wheelbase from the center of gravity (CG) to front and rear axle, respectively. m represents vehicle unsprung mass, and $Z_g$ represents the vehicle center of gravity (CG) height. g represents a gravity coefficient. ax and ay are longitudinal and lateral acceleration, respectively. $\delta_f$ is the front tires steering angle. $L_f$ is the front axle track width. $T_{z_{total}}$ is the total resistant torque generated around the steering z axis. $F_{Z_{total}}$ is the total resistant force generated around the steering z axis. $N_{fx}$ is the normal tire force.

In some examples, lateral force in a rear axle of the vehicle is estimated based on yaw motion $I_z r$ calculated from the IMU 70 and external yaw moment due to torque vectoring devices as:

$$I_z r\cdot = T_M + L_1 F_{yf}\cos(\delta_f) - L_2 F_{yr};\text{ and}$$

$$F_{yr} = (T_M + L_1 F_{yf}\cos(\delta_f) - I_z\dot{r})/L_2$$

where $T_M$ is traction force, $L_1$ is front axle length, $F_{yf}$ is front lateral tire force, $L_2$ is rear axle length, $F_{yr}$ is rear lateral tire force, $I_z$ is the vehicle yaw moment, and r is vehicle yaw rate.

Lateral acceleration $\hat{a}_y$ can be estimated utilizing estimation of lateral forces in the front and rear axles as follows:

$$\hat{a}_y = (F_{yf} + F_{yr}\cos(\delta_r))/M$$

The lateral acceleration is compared to the lateral acceleration measured by the IMU 70 as follows: $\hat{a}_y - \hat{a}_{ymeas} = \Delta a_y \geq T$. If the difference between the estimated acceleration $\hat{a}_y$ and measured lateral acceleration $\hat{a}_y$meas exceeds a predetermined threshold T, then it can be concluded that the vehicle is subjected to road angle. The road angle contribution to lateral forces is computed as:

$$F_{y,road} =$$

-continued $$\begin{cases} mg(\sin\varphi) & (\varphi = \varphi_L = \varphi_R)\text{: constant angle} \\ mg(\sin\varphi_L - \sin(\varphi_L - \varphi_R) = \sin(\varphi_{eqv}) & \varphi_L \neq \varphi_R\text{: variable angle} \end{cases}$$

Therefore, generally $\hat{a}_{ymeas} - \hat{a}_y = mg\sin(\varphi_{eqv})$.

With the above crown angle estimations, the method 200 proceeds to block 320. At block 320 ("Cross Error Calculation"), a cross error calculation is performed on the crown angle estimations as follows:

$$E = \begin{bmatrix} 0 & \theta_{IMU} - \theta_{Map} & \theta_{IMU} - \theta_{Cam} & \theta_{IMU} - \theta_{Rack} \\ \theta_{Map} - \theta_{IMU} & 0 & \theta_{Map} - \theta_{Cam} & \theta_{Map} - \theta_{Rack} \\ \theta_{Cam} - \theta_{IMU} & \theta_{Cam} - \theta_{Map} & 0 & \theta_{Cam} - \theta_{Rack} \\ \theta_{Rack} - \theta_{IMU} & \theta_{Rack} - \theta_{Map} & \theta_{Rack} - \theta_{Cam} & 0 \end{bmatrix}$$

The method 200 then proceeds to block 322. At block 322 ("Adapt weight based on the correlated error"), the method 200 adapts weights to each of the crown angle estimations as follows:

$$[w_1, w_2, w_3, w_4] = f([E])$$

The method 200 then proceeds to block 324. At block 324 ("Update Fusion"), the method 200 develops a fused crown angle $\theta_f$ based on the weights from each of the crown angle estimations as follows:

$$\theta_f = w_1\theta_{IMU} + w_2\theta_{Cam} + w_3\theta_{Map} + w_4\theta_{Rack}$$

With the fused crown angle calculated as shown above, the method 200 determines if a crown angle was detected. If a crown angle was not detected at block 220, the method 200 proceeds to block 214 to perform the LPC torque calculation without adjustment before proceeding to block 216 and ending.

If a crown angle was detected from block 220, the method proceeds to block 222. At block 222 ("Or"), the method 200 can select between two different strategies for correcting LPC. In the first strategy at block 224 ("LPC Torque=0"), the torque applied by the LPC is reset to zero. This allows the driver of the vehicle to compensate for the lead/pull condition until the ADAS feature is no longer active.

In a second approach at block 226 ("LPC Adjustments?"), the method 200 will calculate a compensating steering wheel torque to apply. The compensating steering wheel torque corrects for the direction, such as left or right crown, and magnitude of the crown angle on the new road segment. To determine the compensating steering wheel torque to apply, the method 200 proceeds to block 228.

At block 228 ("Torque Calculation"), the method 200 determines the compensating steering wheel torque to apply for the new road segment. In one example, the method 200 determines the compensating steering wheel torque through utilizing a calibration table. The calibration table includes predetermined steering wheel torques to apply for different combinations of crown direction and magnitude of crown angle as follows:

$$T_{steering\ wheel\ feedback} = f(\varphi_{eqv})$$

Where $T_{steering\ wheel\ feedback}$ is the steering wheel torque that is applied at $f(\varphi_{eqv})$ for a given crown direction and magnitude The torque feedback can be applied more gradually at a smaller crown road angle below a predetermined threshold value and more aggressively at larger crown road angles above a predetermined threshold value, vice versa, depending on how the system is calibrated. Thus, $$T_{steering,non\text{-}crown\ angle}(t) = T_{LPC,learning}(t) - T_{steering\ wheel\ feedback}(t)$$

Where $T_{LPC}$ is a previously learned feedback torque on a certain angle of a crowned road and $T_{steering\ wheel\ feedback}$ is the estimated road resultant steering wheel torque. The method 200 can then proceed to block 230.

At block 230 ("LPC Computation"), the method 200 performs the LPC Computation. In case of the road angle change, the calculated steering wheel torque feedback, $T_{steering\ wheel\ feedback}$ is utilized for the LPC computation as follows:

$$T_{steering\ wheel\ correction,total}(t) = T_{steering,non\text{-}crown\ angle}(t-1) + T_{steeringwheelfeedback}(\varphi_{eqv}(t))$$

The method 200 then outputs the LPC adjusted torque as $T_{steering\ wheel\ correction,total}(t)$ and proceeds to block 216 and ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steering system, comprising:
- a plurality of sensors; and
- a controller in communication with the plurality of sensors, wherein the controller is configured to:
  - determine a counter-torque to apply to the steering system with a leads and pulls compensation system based on an input to a steering wheel;
  - apply the counter-torque to the steering system;
  - determine an operating status of an advanced driver-assistance system;
  - determine an angle of a road surface based on the plurality of sensors when the advanced driver-assistance system is activated; and
  - apply an updated counter-torque to the steering system when the advanced driver-assistance system is activated and both a magnitude of the angle of the road surface changes and a direction of the angle of the road surface changes.

2. The steering system of claim 1, wherein the angle of the road surface is determined based on individual estimates of the angle of the road surface from the plurality of sensors.

3. The steering system of claim 2, wherein the individual estimates of the angle of the road surface are each weighted to generate a fused angle of the road surface.

4. The steering system of claim 3, wherein the individual estimates of the angle of the road surface include an inertial measurement unit based angle estimation, a map based angle estimation, a camera based angle estimation, and a steering rack force angle estimation.

5. The steering system of claim 2, wherein the controller is configured to determine the angle of the road surface based on performing a cross error calculation on each of the individual estimates of the angle of the road surface.

6. The steering system of claim 1, wherein the updated counter-torque includes applying zero torque when the advanced driver-assistance system is activated and both the magnitude of the angle of the road surface changes and the direction of the angle of the road surface changes.

7. The steering system of claim 1, wherein the plurality of sensors include a front camera module and an inertial measurement unit.

8. The steering system of claim 7, wherein the controller is configured to determine the angle of the road surface based on high definition map images.

9. The steering system of claim 8, wherein the plurality of sensors include at least one wheel speed sensor.

10. The steering system of claim 1, wherein the steering system is a steer-by-wire system.

11. The steering system of claim 1, wherein the controller is configured to determine the angle of the road surface based on determining a steering rack force.

12. A method of operating a steering system on a vehicle, the method comprising:

determining a counter-torque to apply to the steering system with a leads and pulls compensation system based on an input to a steering wheel on the vehicle;

applying the counter-torque to the steering system on the vehicle;

determining an operating status of an advanced driver-assistance system on the vehicle;

determining an angle of a road surface supporting the vehicle with a plurality of sensors on the vehicle when the advanced driver-assistance system is activated; and applying an updated counter-torque to the steering system when the advanced driver-assistance system is activated and both a magnitude of the angle of the road surface changes and a direction of the angle of the road surface changes.

13. The method of claim 12, wherein the angle of the road surface is determined based on individual estimates of the angle of the road surface from the plurality of sensors.

14. The method of claim 13, wherein the individual estimates of the angle of the road surface are each weighted to generate a fused angle of the road surface.

15. The method of claim 14, wherein the individual estimates of the angle of the road surface include an inertial measurement unit based angle estimation, a map based angle estimation, a camera based angle estimation, and a steering rack force angle estimation.

16. The method of claim 13, wherein determining the angle of the road surface supporting the vehicle includes performing a cross error calculation on each of the individual estimates of the angle of the road surface.

17. The method of claim 12, wherein the updated counter-torque includes applying zero torque when the advanced driver-assistance system is activated and both the magnitude of the angle of the road surface changes and the direction of the angle of the road surface changes.

18. The method of claim 12, wherein the plurality of sensors include a front camera module and an inertial measurement unit.

19. A vehicle comprising:

a steering system configured to change a road angle with respect to at least one of a plurality of wheels;

a plurality of sensors; and a controller in communication with the plurality of sensors and the steering system, wherein the controller is configured to:

determine a counter-torque to apply to the steering system with a leads and pulls compensation system based on an input to a steering wheel on the vehicle;

apply the counter-torque to the steering system;

determine an operating status of an advanced driver-assistance system on the vehicle;

determine an angle of a road surface supporting the vehicle based on the plurality of sensors on the vehicle when the advanced driver-assistance system is activated; and apply an updated counter-torque to the steering system when the advanced driver-assistance system is activated with a magnitude and a direction of the angle of the road surface changes.

20. The vehicle of claim 19, wherein the controller is configured to determine the angle of the road surface based on determining a steering rack force.

* * * * *